(12) United States Patent
Yang

(10) Patent No.: US 6,697,190 B2
(45) Date of Patent: Feb. 24, 2004

(54) FLEXIBLE AND FAST ELECTRONIC CONTROL OF OPTICAL DEVICES

(75) Inventor: Dan Dan Yang, Ottawa (CA)

(73) Assignee: Dowslake Microsystems Corporation, Santa Clara, CA (US)

( * ) Notice: Subject to any disclaimer, the term of this patent is extended or adjusted under 35 U.S.C. 154(b) by 0 days.

(21) Appl. No.: 10/146,035

(22) Filed: May 16, 2002

(65) Prior Publication Data

US 2003/0214702 A1 Nov. 20, 2003

(51) Int. Cl.[7] .............................. H01G 3/00; H04B 10/02
(52) U.S. Cl. ..................... 359/341.4; 372/38.1; 398/177
(58) Field of Search ....................... 359/341.4; 398/177; 372/38.1

(56) References Cited

U.S. PATENT DOCUMENTS 5,268,786 A * 12/1993 Matsushita et al. .......... 359/341
6,417,964 B1 * 7/2002 Zhang et al. ............ 359/341.41

* cited by examiner

*Primary Examiner*—Mark Hellner
(74) *Attorney, Agent, or Firm*—Cassan MacLean

(57) ABSTRACT

Methods and devices for controlling an optical device. In one embodiment, the optical device is directly controlled by an outside analog electrical signal. Depending on the voltage or current level of the electrical signal, the output of the optical device is changed accordingly. An operational amplifier may be used to amplify the analog electrical signal prior to the signal being received by the circuitry of the optical device. For maximum flexibility in control, a switch can be coupled to the operational amplifier so that either analog or digital control signals can be used.

21 Claims, 4 Drawing Sheets

FLEXIBLE AND FAST ELECTRONIC CONTROL OF OPTICAL DEVICES

FIELD OF THE INVENTION

The present invention relates to optical devices and is particularly applicable but not limited to devices and methods for flexible and fast control of such optical devices.

BACKGROUND TO THE INVENTION

The telecommunications revolution of the past few years has seen the increasing migration of telecommunications traffic from conventional copper wire networks to optical networks. This migration has led to an increased demand for not only optical components but also for better means of controlling them.

Conventional optical devices are currently controlled by means of a digital interface. An RS-232 interface, with appropriate corresponding circuitry, is usually interface with an optical device. A control word is sent from a personal computer or a dedicated microcontroller to the RS-232 interface to control the optical device using generally accepted communications protocols.

This control scheme can be seen schematically in FIG. 1. The optical device 2 interfaces with a microcontroller 4 for controlling the optical device. The microcontroller 4 is usually equipped with a suitable digital interface such as an RS-232 or a serial LVTTL for communicating with a second microcontroller 6. The second microcontroller 6 sets the parameters for the optical device based on external data or stimuli.

One drawback of this current control scheme is the use of a computer-based interface such as the RS-232 interface. While such interfaces are useful for their programability, they suffer from the limitations of the digital nature of the interface. The speeds at which the data can be sent to the optical device is limited by the speed of the interface. Furthermore, such a digital interface necessarily requires extra processing that can add further delays to the time delay between the control signal being sent and the reaction of the device. Also, the use of a communications protocol to communicate to the device can be quite cumbersome.

Another possible drawback to the digital interface is its reliability. The use of digital processing requires the presence of fragile digital processing equipment between the optical device and the end user. If such digital equipment is used in an installation, such equipment is subject to breakdown, interruption, and damage from extraneous factors as weather, weather effect such as lightning storms, and natural catastrophes such as earthquakes and fires. These occurrences can severely affect digital equipment, thereby interrupting any optical communications links carried by the optical device controlled by the digital equipment.

An economic drawback of the current control schemes for optical devices is the presence of the RS-232 interface. This interface requires a costly computer or micro-controller positioned between the optical device and any control signals. Analog control signals need to be digitized and approximated while digital control signals need to be translated into a format acceptable to the RS-232 interface.

It should be clear that an alternative to the current optical device interfaces is needed. Such a solution should allow direct control of the optical device and such direct control should allow for shorter periods between the control signal being received and a corresponding change in the optical device output. Such a solution should also be less fragile than the current digital interfaces.

SUMMARY OF THE INVENTION

The present invention relates to methods and devices for controlling an optical device. In one embodiment, the optical device is directly controlled by an outside analog electrical signal. Depending on the voltage or current level of the electrical signal, the output of the optical device is changed accordingly. An operational amplifier may be used to amplify the analog electrical signal prior to the signal being received by the circuitry of the optical device. For maximum flexibility in control, a switch can be coupled to the operational amplifier so that either analog or digital control signals can be used.

In a first aspect, the present invention provides a method of directly controlling an optical device with a controllable output, the method comprising:
 a) receiving an electrical signal; and
 b) changing an output level of the optical device based on a characteristic of said electrical signal.

In a second aspect, the present invention provides an optical device module comprising:
 an optical device;
 receiving means for receiving an electrical signal for controlling said optical device; and
 control means for controlling an output level of said optical device based on a characteristic of said electrical signal wherein said receiving means is coupled to said control means and said control means is coupled to said optical device.

In a third aspect, the present invention provides an optical device module comprising:
 an optical device;
 receiving means for receiving a signal for controlling said optical device;
 control means for controlling an output level of said optical device based on said signal; and
 switch means for switching and choosing a control signal from at least two control signals, a chosen control signal being passed on to said receiving means, wherein said receiving means is coupled to said control means and said control means is coupled to said optical device, said switch means being coupled to said receiving means.

In a fourth aspect, the present invention provides a method of controlling an optical device with a controllable output, the method comprising:
 a) receiving at least two control signals for controlling said optical device, at least one of said at least two control signals being an analog electrical signal;
 b) selecting one of said at least two control signals;
 c) in the event a selected control signal is an analog electrical signal, changing an output level of the optical device based on a characteristic of said electrical signal.

BRIEF DESCRIPTION OF THE DRAWINGS better understanding of the invention will be obtained by considering the detailed description below, with reference to the following drawings in which.

DETAILED DESCRIPTION

Figure 2:
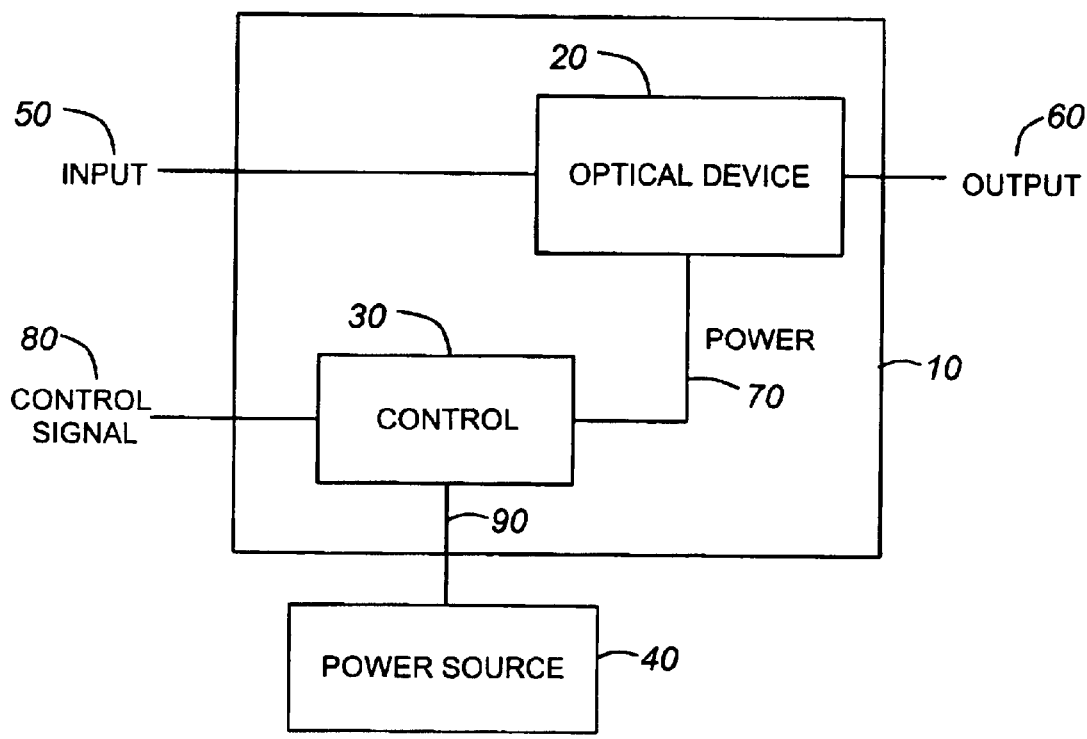
FIG. 2 is a block diagram of an optical device module, controlled by an analog control signal.

Referring to FIG. 2, a block diagram of an optical device module 10 is presented. The optical device module 10 has an optical device 20, a control block 30, and is coupled to a power source 40. The optical device 20 has an optical input 50 and an optical output 60 and receives power input 70 from the control block 30. The control block 30 receives a control signal 80 and power input 90 from the power source 40.

In one embodiment the optical device module 10 works by receiving an input optical signal by way of the optical input 50. This input optical signal is to be modified in some way by the optical device. The signal may need to be amplified, attenuated, or modified to produce an output optical signal by way of the optical output 60. The amount by which the input optical signal is to be modified is determined by the control signal 80. The control signal 80 is an analog electrical signal whose characteristics determine the output optical signal. Based on these characteristics of the control signal 80, the control block 30 controls the amount of power reaching the optical device 20. Thus, depending on the function of the optical device 20, the control block 30 may allow either more or less power to reach the optical device if the control signal 80 has a higher level of its specific characteristic. These characteristics can be the voltage level of the control signal or it can be the current level of the control signal.

As an example, the voltage level of the control signal can be used to directly control the output of the optical device. If the optical device is a pump laser, the amount of power provided to the pump laser determines its output level. As such, the control block 30 can directly control the amount of power being provided to the pump laser. Thus, a higher voltage in the control signal can increase the output level of the pump laser. This can be implemented by using a voltage controlled resistance circuit element in the control block to control the amount of power being passed to the optical device—a lower voltage provides higher resistance and thereby lower power, while a higher voltage provides lower resistance and thereby higher power. Conversely, the control block can be configured so that lower control signal voltages will provide lower resistance and higher power while higher control signal voltages will provide higher resistance and lower power.

As another example, the current level of the control signal can be used in a manner similar to the way voltage levels of the control signal was used above. The current level can be used to control a current controlled resistance element. Depending on the current level of the control signal, more or less power is provided to the optical device and, accordingly, the output level of the output optical signal is controlled.

The above described methods of controlling a pump laser can be applied to different types of optical devices such as optical amplifiers, optical attenuators variable attenuators, tunable filters and any other optical device that has a controllable variable output. For amplifiers and tunable or controllable tunable filtering, calibrating the control signal voltage or current levels may be required so that predictable amplification levels can be obtained for specific voltage or current levels of the control signals. Similarly, attenuators may also require calibration with the control signal so that predictable results can be obtained.

Figure 3:
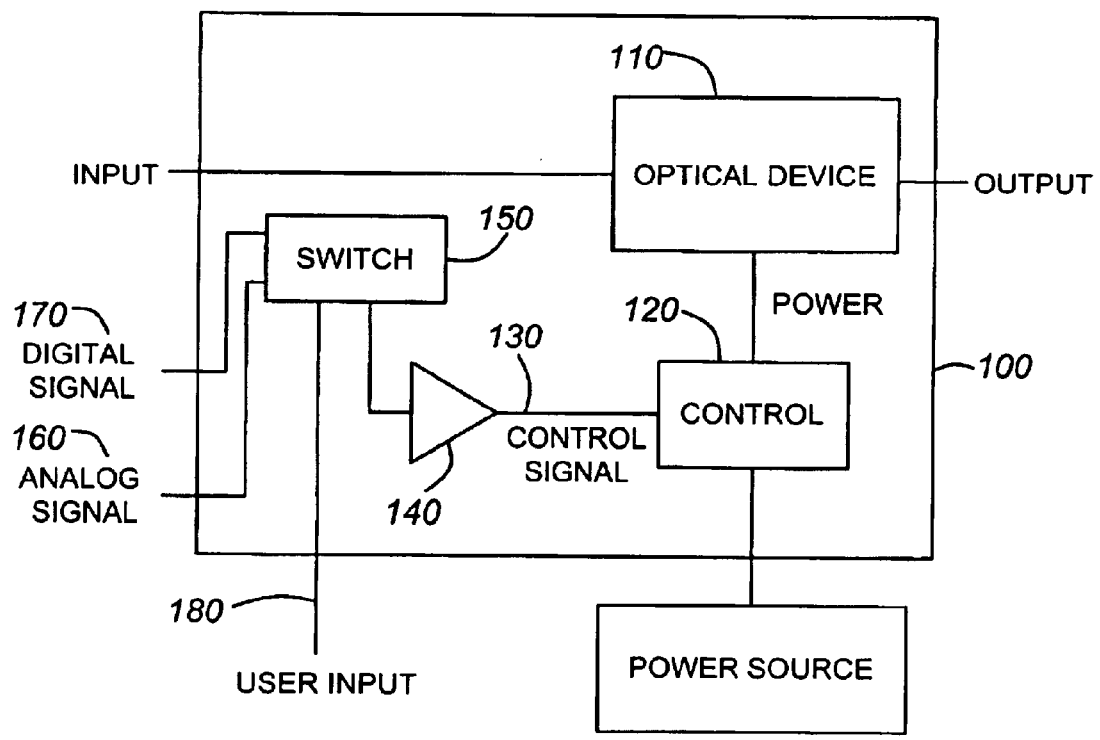
FIG. 3 is a block diagram of an optical device module which can be controlled by either a digital control signal or an analog control signal.

Referring to FIG. 3, a second embodiment of the invention is illustrated. FIG. 3 is a block diagram of an optical device module that allows for both digital and analog control signals to be used. As can be seen in FIG. 3, the optical device module 100 has an optical device 110, and a control block 120. In addition to these, the control signal line 130 couples the control block 120 to an operational amplifier 140. The control signal is sent from the operational amplifier 140 to the control block 120. The operational amplifier 140 receives the control signal from a switch 150. The switch 150 allows either an analog signal 160 or a digital signal 170 as the control signal to be sent to the operational amplifier 140. The switch 150 can, depending on the user's preferences, switch to a direct analog control signal or a digital or digitized control signal by way of the user input line 180. Depending on the value of the user input signal on the user input line 180, the output of the optical device module can be controlled by a direct analog signal or by a digital or digitized control signal.

It should be noted that the term digital or digitized control signal refers to a digital approximation of an analog signal. As is know in the art, digitally quantized versions of an analog signal is merely an approximation of the analog signal. The closeness of the approximation is dependent upon the resolution of the sampling or quantizing device that samples the signal. It should further be noted that some applications will require a digital or a digitized control signal while others may require an analog control signal. The digitized control signal, by virtue of its controllability, will provide precision as to the voltage or current required. The analog control signal, on the other hand, by virtue of its continuity, will provide accuracy as to the voltage or current required.

Figure 4:
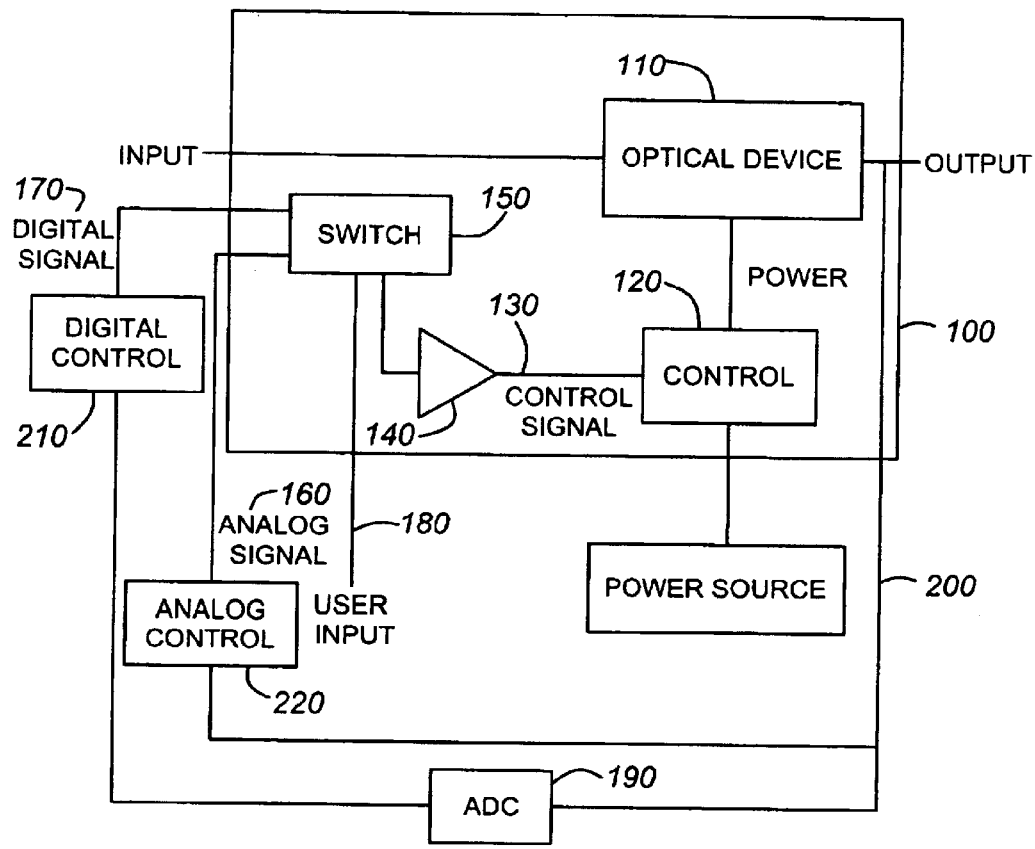
FIG. 4 is a block diagram of an optical device module of FIG. 3 with both digital and analog feedback control loops.

A similar approach to the above can be used for monitoring the output of the optical device. Referring to FIG. 4, a block diagram similar to FIG. 3 is illustrated. In addition to the elements in FIG. 3, in FIG. 4 an analog-to-digital converter (ADC) 190 is coupled between a tap couple 200 from the output of the optical device 110 and a digital control block 210. An analog control block 220 is also coupled to the tap couple 200 and provides the analog control signal 160 while the digital control block 210 provides the digital or digitized control signal 170. The tap couple 200 provides a feedback control line for the analog control block 220. The analog control block 220 provides the analog control signal 160 and, based on the output of the optical device, can change the characteristics of the analog control signal 160 so that the optical device output is within the range of any configured settings. Similarly, the ADC 190 provides a feedback loop line for the digital control block 210. Based on the digitized output of the optical device 110, as converted by the ADC 190, the digital control block 210 changes the characteristics of the digitized control signal 170.

It should be clear that both digital and analog control schemes may require calibration. For even better control of the optical device output, specific voltages or currents may be calibrated to correspond to specific output levels of the optical device. As an example, if 1 V signal was to correspond to a 10 dBm output of the optical device, the signal can first be sent to a calibrating micro-controller and the micro-controller can send the appropriate analog control signal to the analog control block 220 to produce a 10 dBm optical device output. Such a control scheme is a hybrid of the analog/digital control schemes outlined above. The digital micro-controller which receives the outside signal and both calibrates and sends the analog signal to the analog control block 220 represents the digital side while the analog control block 220 and the analog control signal 160 provide the analog side.

While the abovementioned diagrams illustrate the operational amplifier 140 as being contained in the optical device module 100, this can be placed outside the module 100. Furthermore, such an operational amplifier may not be required as long as the signal levels of the analog or the digitized control signals are sufficient to drive the control block 120.

Figure 5:
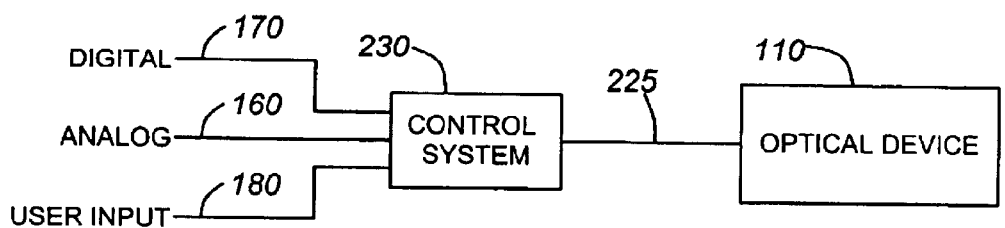
FIG. 5 is a block diagram of a control system block controlling an optical device.

It should be noted that while the above description and diagrams illustrate an optical device module that integrates an analog/digital control system for the optical device, this control system does not have to be integrated into an optical device module. As can be seen in FIG. 5, the control system block 230 is separate from the optical device 110. The control system block 230 has similar inputs to the module 100 in FIGS. 3 and 4 with the main difference being the output control signal 225 being sent from the control system block 230 to the optical device. The output control signal 225 determines the output 60 of the optical device 110 based on either the digital/digitized control signal 170 or the analog control signal 160. The user input 180 can select from either of these two inputs or an automated selector can be made based on events and circumstances. As an example, the analog control signal 160 can provide redundancy to the control system 230—if the digital control signal 170 is interrupted, the analog control signal may be automatically selected to provide the necessary control signal.

Figure 6:
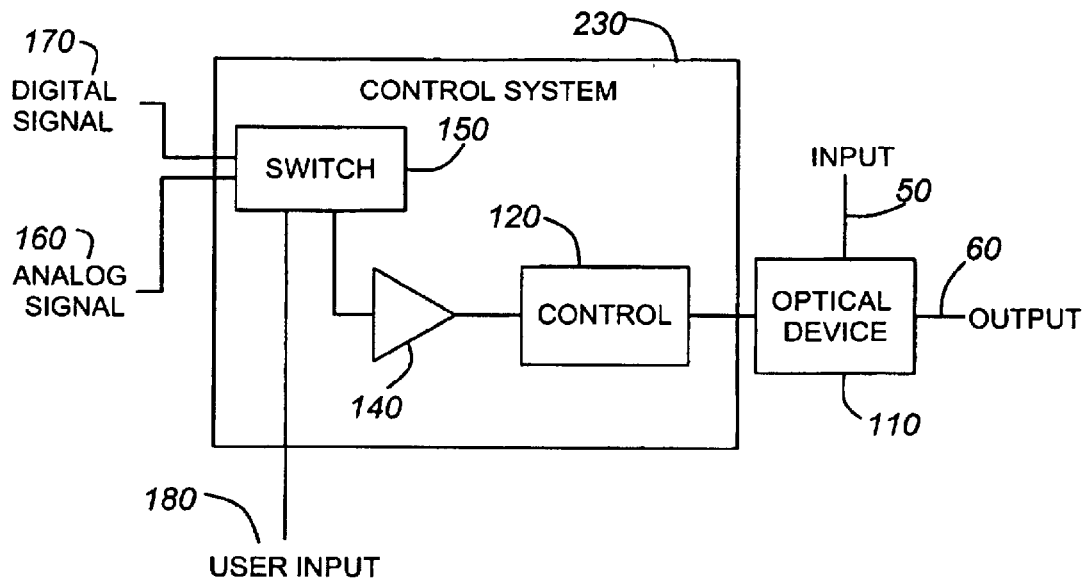
FIG. 6 is a block diagram illustrating the internal components of the control system block in FIG. 5.
Figure 7:
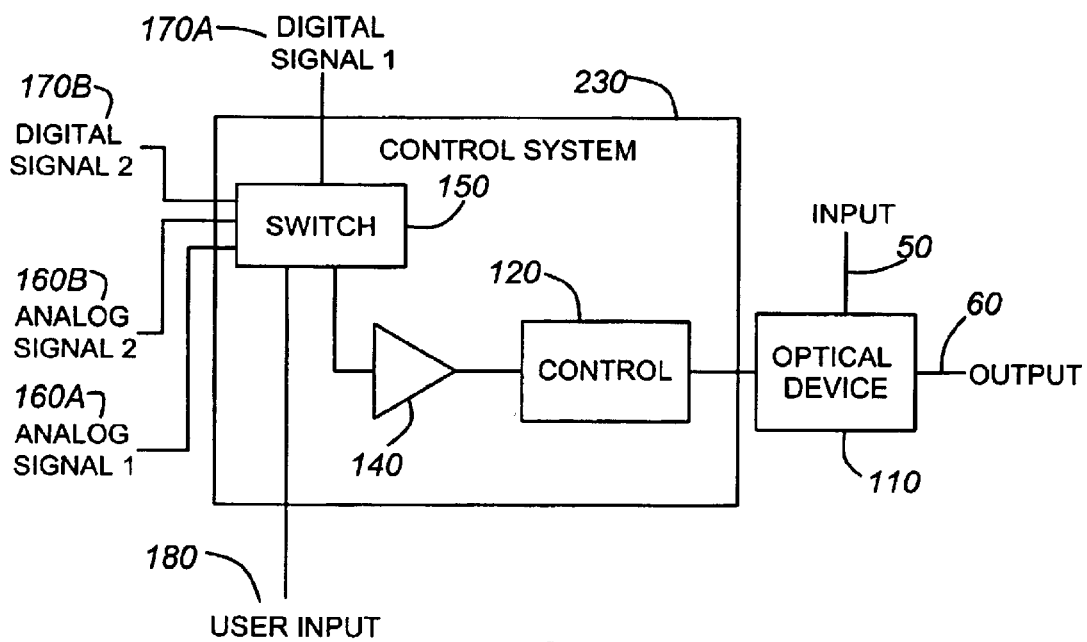
FIG. 7 is a block diagram illustrating the control system block of FIG. 4 with receiving multiple control signals.

The internal components of such a control system block 230 are similar to those of the optical device module 100 in FIGS. 3 and 4. Referring to FIG. 6, a block diagram illustrating the internal components for such a control system block is provided. A switch 150 receives the digital control signal 170, the analog control signal 160 and if present, a user input signal 180. An operational amplifier 140 amplifies the chosen control signal and sends this amplified control signal 130 to the control block 120. The control block 120 determines what output control signal 225 is needed based on the chosen control signal and sends this output control 225 to the optical device 110.

The above control scheme using both digital and analog control signals provides reliability, speed and flexibility in a control system. For flexibility in programmability, the digital control signal can be used. For speed and reliability, the analog control signal will be faster than the digital control signal and it is less subject to adverse environmental conditions as digital control computers/microcontrollers. Also, the analog control signal provides redundancy to the digital control signal—if the control signal can be automatically chosen to provide the required signal.

As an extension of the above control scheme, multiple control signals can be fed into the control system block 230 for greater redundancy and control. These multiple control signals can be any combination of analog and digital control signals. As can be seen in FIG. 6, digital control signals 170A, 170B are received by the switch 150 along with analog control signal 160A, 160B. Any one of these control signals can be chosen using the switch 150 to control the output of the optical device 110. It should be noted that, while impractical, any number of these control signals can be active at any one time, only one control signal at any one time is selected by way of the switch 150. Thus, only one control signal is controlling the output of the optical device.

Figure 1:
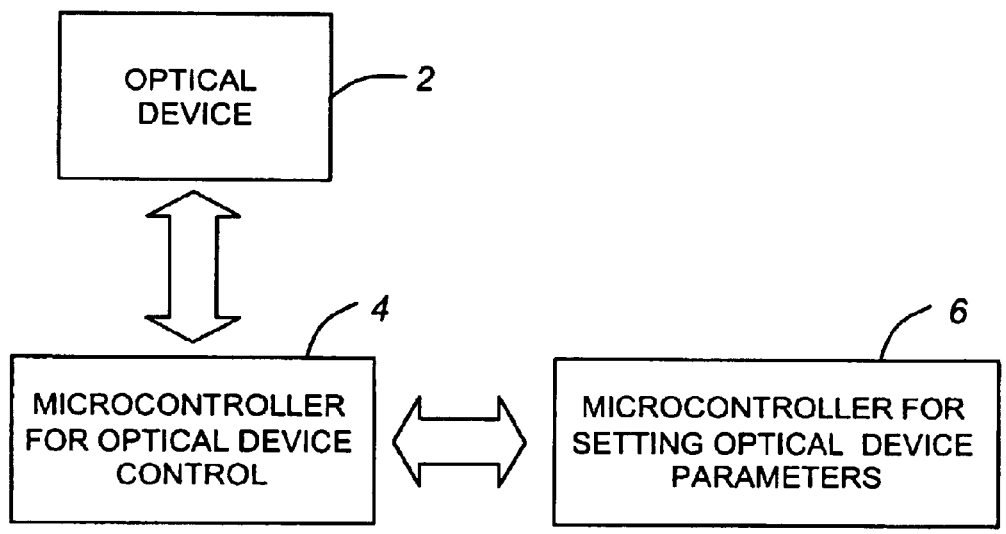
FIG. 1 is a block diagram of a control scheme for an optical device according to the prior art.
Figure 8:
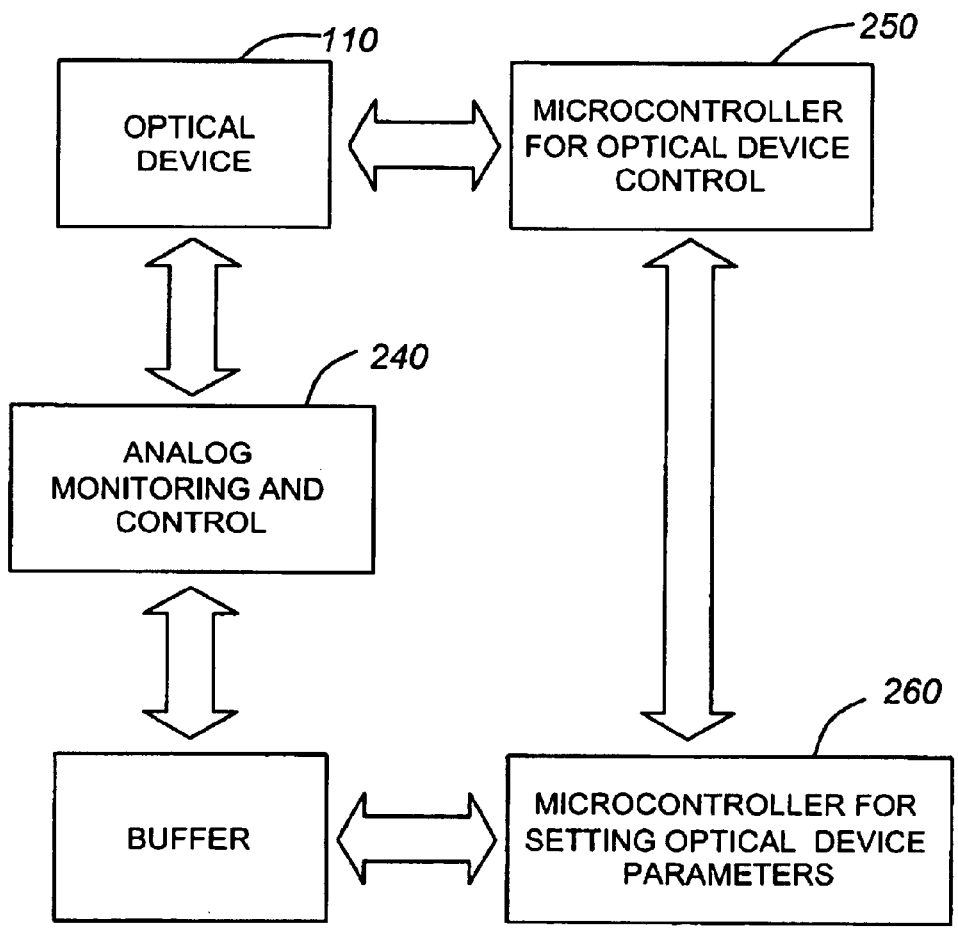
FIG. 8 is a high level block diagram of the system in FIG. 5, and is analogous to the block diagram of FIG. 1.

Referring to FIG. 8, a block schematic diagram of the system of FIG. 4 is illustrated. The optical device 110 receives an analog control signal from an analog monitoring and control block 240 and a digitized control signal from a microcontroller 250. Both of these blocks 240, 250 receive their inputs from a microcontroller 260 for setting the optical device settings and parameters. Clearly, as noted above, only one of these control signals is used by optical device at any one time. Furthermore, other control blocks similar to blocks 240, 250 may be used as long as the optical device uses only one control signal at one time.

A person understanding this invention may now conceive of alternative structures and embodiments or variations of the above all of which are intended to fall within the scope of the invention as defined in the claims that follow.

I claim:

1. A method of directly controlling an optical device with a controllable output, the method comprising:
    a) receiving plurality of electrical control signals; and
    b) selecting a chosen control signal from said plurality of control signals;
    c) changing an output level of the optical device based on a characteristic of said chosen control signal
wherein said plurality of control signals includes at least one analog control signal and at last one digitized control signal.

2. A method according to claim 1 wherein said characteristic is a voltage level of said electrical signal.

3. A method according to claim 1 wherein said characteristic is a current level of said electrical signal.

4. A method according to claim 1 wherein said chosen control signal is amplified prior to step a).

5. A method according to claim 1 wherein said optical device is chosen from a group consisting of:
    a pump laser
    a tunable optical filter;
    an optical variable attenuator; and
    an optical variable amplifier.

6. An optical device module comprising:
    an optical device;
    receiving means for receiving at least one analog electrical signal and at least one digital electrical signal for controlling said optical device; and
    control means for controlling an output level of said optical device based on a characteristic of one of said electrical signals
wherein said receiving means is coupled to said control means and said control means is coupled to said optical device.

7. An optical device module according to claim 6 wherein said characteristic is a voltage level of said electrical signal.

8. An optical device module according to claim 6 wherein said characteristic is a current level of said electrical signal.

9. An optical device module according to claim 6 wherein said optical device is chosen from a group consisting of:
    a pump laser
    a tunable optical filter;

an optical variable attenuator; and an optical variable amplifier.

10. An optical device module according to claim 6 wherein said receiving means is an operational amplifier.

11. An optical device module according to claim 10 wherein said operational amplifier amplifies said electrical signal prior to sending said electrical signal to said control means.

12. A system for controlling an output of an optical device, the system comprising:

receiving means for receiving a signal for controlling said optical device;

control means for controlling an output level of said optical device based on said signal; and switch means for switching and choosing a control signal from at least two control signals, a chosen control signal being passed to said receiving means, Wherein said receiving means is coupled to said control means and said control means is coupled to said optical device, said switch means being coupled to said receiving means and wherein said at least two control signals include at least one analog control signal and at least one digital control signal.

13. A system according to claim 12 wherein if an analog control signal is the chosen control signal, the control means controls the output level of said optical device based on a characteristic of said analog control signal.

14. A system according to claim 13 wherein said characteristic is a voltage level of said analog control signal.

15. A system according to claim 13 wherein said characteristic is a current level of said analog control signal.

16. A system according to claim 12 wherein said optical device is chosen from a group consisting of:

a pump laser a tunable optical filter;

an optical variable attenuator; and an optical variable amplifier.

17. A method of controlling an optical device with a controllable output, the method comprising:

a) receiving at least two control signals for controlling said optical device, at least once of said at least two control signals being an analog electrical signal;

b) selecting one of said at least two control signals;

c) in the event a selected control signal is an analog electrical signal, changing an output level of the optical device based on a characteristic of said electrical signal wherein said at least two control signals include at least one analog control signal and at last once digitized control signal.

18. A method according to claim 17 wherein said characteristic is a voltage level of said electrical signal.

19. A method according to clam 17 wherein said characteristic is a current level or said electrical signal.

20. A method according to claim 17 wherein said electrical signal is amplified prior to step a).

21. A method according to claim 17 wherein said optical device is chosen from a group consisting of:

a pump laser a tunable optical filter;

an optical variable attenuator; and an optical variable amplifier.

* * * * *